(No Model.)

A. B. SCHOFIELD.
CHOPPING KNIFE.

No. 488,289.  Patented Dec. 20, 1892.

Witnesses:-
D. H. Hayford
C. Sundgren

Inventor:-
Albert B. Schofield
by attorneys
Brown & Duvall

UNITED STATES PATENT OFFICE.

ALBERT B. SCHOFIELD, OF BROOKLYN, NEW YORK.

CHOPPING-KNIFE.

SPECIFICATION forming part of Letters Patent No. 488,289, dated December 20, 1892.

Application filed June 11, 1892. Serial No. 436,318. (No model.)

*To all whom it may concern:*

Be it known that I, ALBERT B. SCHOFIELD, of Brooklyn, in the county of Kings and State of New York, have invented a new and useful Improvement in Chopping-Knives, of which the following is a specification.

My invention relates to an improvement in chopping knives in which provision is made for working the material to be chopped toward the center of the chopping bowl and increasing the cutting effect of the knife and at the same time preventing the ordinary wear at the middle of the bottom of the bowl.

Figure 1:
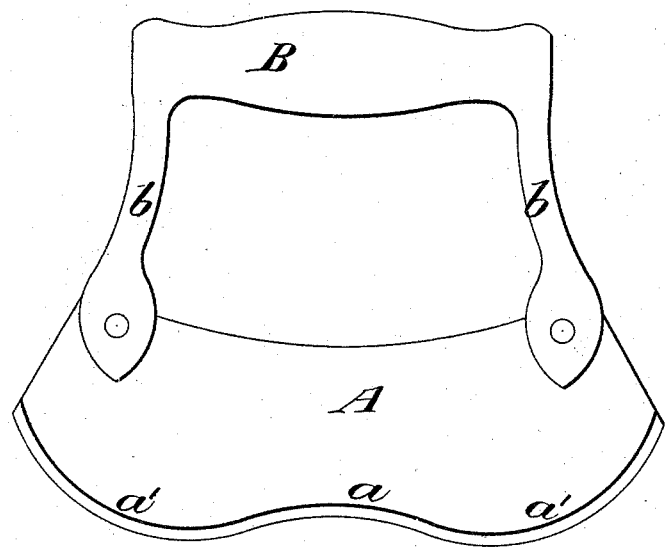
Figures 2, 3:
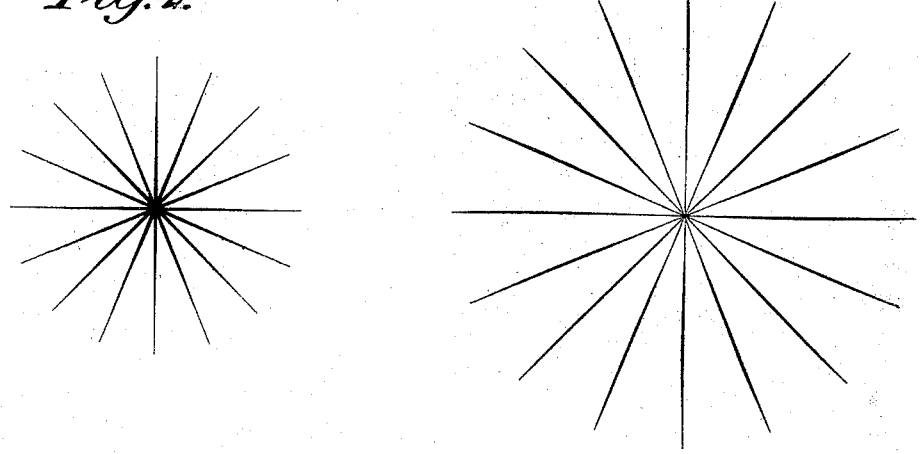

A practical embodiment of my invention is represented in the accompanying drawings in which, Figure 1 is a view of the knife in side elevation, Fig. 2 is a diagram showing the effect upon the bottom of a bowl of the use of the ordinary chopping knife, and Fig. 3 is a diagram showing the effect upon the bottom of a bowl of the use of a knife such as represented in Fig. 1.

I have chosen, to illustrate my invention, a chopping knife, of the single blade type, but I do not wish to be understood as limiting myself to the single blade type alone, as my invention may be applied to the ordinary multiple blade chopping knife whether the blades be arranged parallel with one another or cross each other.

The blade is denoted by A, the handle by B and the arms which connect the handle with the blade by b.

The edge of the blade A is provided with a receding central portion a, producing upon either side the lobes a'. The cutting edge extends continuously from one end of the blade A to the other and the recession of the central portion a is intended to be so gradual that the edge may be readily ground to keep it sharp throughout its entire length. It is well known that the ordinary blade, with a centrally extended edge, has a tendency to both crowd the material to be chopped away from the central portion of the bowl or away from the central portion of the descending blade, and also to cut out the bottom of the bowl at its middle portion.

Diagram Fig. 2, illustrates the effect of several cuts of the ordinary blade. It will be noticed that they are broadest where they cross at the center and gradually taper toward their ends, the blade which produces them acting as a wedge to crowd the material away from the center toward the sides of the bowl, and not only thus, but their deepest cut is where they cross and it is at this point that the blade is repeatedly brought into contact with bottom of the bowl within very narrow limits and the effect is to cut the bowl out rapidly at that point. By making the central portions of the cutting edge recede as shown in Fig. 1, the effect will be substantially as represented in diagram Fig. 3. The material will be crowded toward the center and will become rapidly sub-divided by the repeated cuts at the center, the blade upon the opposite sides of the center will do its work easily and effectively and the central portion of the bottom of the bowl will be spared the digging action of the ordinary blade. While the central portion of the blade may not cut through to the bottom of the bowl, it will cut through the greater portion of the thicker mass at that point and the uncut portions at the bottom will gradually work toward the top, as the larger grains or pieces in an agitated mass are bound to do, and the many cuts at the center will sub-divide that portion as rapidly as the through cuts, more widely separated will sub-divide the portion farther from the center.

What I claim is:

A chopping knife comprising a cutting blade, the central portion of the cutting edge of which recedes from the end portions of the cutting edge, substantially as set forth.

ALBERT B. SCHOFIELD.

Witnesses:
FREDK. HAYNES,
GEORGE BARRY.